United States Patent
Bräunling et al.

(10) Patent No.: US 11,050,055 B2
(45) Date of Patent: Jun. 29, 2021

(54) LITHIUM-ION BATTERIES

(71) Applicant: WACKER CHEMIE AG, Munich (DE)

(72) Inventors: Daniel Bräunling, Burghausen (DE); Stefan Haufe, Neubiberg (DE)

(73) Assignee: WACKER CHEMIE AG, Munich (DE)

( * ) Notice: Subject to any disclaimer, the term of this patent is extended or adjusted under 35 U.S.C. 154(b) by 120 days.

(21) Appl. No.: 16/339,605

(22) PCT Filed: Oct. 5, 2016

(86) PCT No.: PCT/EP2016/073770
§ 371 (c)(1),
(2) Date: Apr. 4, 2019

(87) PCT Pub. No.: WO2018/065046
PCT Pub. Date: Apr. 12, 2018

(65) Prior Publication Data
US 2019/0237759 A1    Aug. 1, 2019

(51) Int. Cl.
| | |
|---|---|
| *H01M 10/0525* | (2010.01) |
| *H01M 10/052* | (2010.01) |
| *H01M 10/0567* | (2010.01) |
| *H01M 10/0568* | (2010.01) |
| *H01M 4/134* | (2010.01) |
| *H01M 4/38* | (2006.01) |
| *H01M 4/02* | (2006.01) |

(52) U.S. Cl.
CPC .......... *H01M 4/386* (2013.01); *H01M 4/134* (2013.01); *H01M 10/052* (2013.01); *H01M 10/0525* (2013.01); *H01M 10/0567* (2013.01); *H01M 10/0568* (2013.01); *H01M 2004/021* (2013.01); *H01M 2004/027* (2013.01); *H01M 2300/002* (2013.01)

(58) Field of Classification Search
CPC ................ H01M 4/134; H01M 4/386; H01M 2004/021; H01M 2004/027; H01M 10/052; H01M 10/0525; H01M 10/0567; H01M 10/0568; H01M 10/0569; H01M 2300/0025; Y02E 60/10
See application file for complete search history.

(56) References Cited

U.S. PATENT DOCUMENTS

| | | |
|---|---|---|
| 5,356,736 A | 10/1994 | Kita et al. |
| 7,476,469 B2 | 1/2009 | Ota et al. |
| 8,124,279 B2 | 2/2012 | Petrat et al. |
| 8,551,661 B2 | 10/2013 | Amine et al. |
| 10,069,165 B2 | 9/2018 | Doelle et al. |
| 2003/0235762 A1 | 12/2003 | Fukui et al. |
| 2005/0214646 A1 | 9/2005 | Kubota |
| 2006/0222944 A1 | 10/2006 | Yamamoto et al. |
| 2009/0208844 A1* | 8/2009 | Kepler ............. H01M 4/625 429/218.1 |
| 2009/0305129 A1 | 12/2009 | Fukui et al. |
| 2016/0126538 A1 | 5/2016 | Hanelt et al. |
| 2016/0365567 A1 | 12/2016 | Troegel et al. |
| 2017/0179482 A1* | 6/2017 | Verbrugge ............ H01M 4/134 |
| 2018/0062201 A1* | 3/2018 | Zhu ....................... H01M 4/525 |

FOREIGN PATENT DOCUMENTS

| | | |
|---|---|---|
| DE | 69027143 T2 | 1/1997 |
| DE | 102013210631 A1 | 12/2014 |
| DE | 102014202180 A1 | 8/2015 |
| EP | 1730800 B1 | 5/2008 |
| JP | 4911835 B2 | 4/2012 |
| WO | 14195407 A1 | 12/2014 |
| WO | 14202529 A1 | 12/2014 |
| WO | 15117838 A1 | 8/2015 |
| WO | 15160773 A1 | 10/2015 |

OTHER PUBLICATIONS

Gu-Yeon Kim and J.R. Dahn, The Effect of some Nitriles as Electrolyte Additives in Li-Ion Batteries, Journal of The Electrochemical Society, 162 (3) A437-A447 (2015).
E. Vinodkumar et al., Exceptional Electrochemical Performance of Si-Nanowires in 1,3-Dioxolane Sotutions, Langmuir 2012, 28, p. 6175-6184.
M. Gauthier, From SI Wafers to Cheap and Efficient Si Electrodes for Li-ion Batteries, Journal of Power Sources, 256, 2014, 32-36.
A. Kawashima, A. et al., Investigation of the Solid Electrolyte Interphase Formed by Fluoroethylene Carbonate on Si Electrodes, Journal of the Electrochemical Society 2011, 158, A798-A801.
D. Aurbach, D. et al., Effect of Fluoroethylene Carbonate (FEC) on the Performance and Surface Chemistry of Si-Nanowire Li-Ion Battery Anodes, Langmuir 2012, 28, 965-976, American Chem. Soc. (US).

* cited by examiner

*Primary Examiner* — Brittany L Raymond
(74) *Attorney, Agent, or Firm* — Brooks Kushman P.C.

(57) ABSTRACT

The invention relates to lithium ion batteries comprising a cathode, an anode containing silicon particles, a separator and an electrolyte, characterized in that the electrolyte contains one or more inorganic salts selected from among the group comprising alkali salts and ammonium salts of nitrate, nitrite, azide, phosphate, carbonate, borates and fluoride, and in that the anode material is only partially lithiated in the fully charged lithium ion battery.

10 Claims, No Drawings

LITHIUM-ION BATTERIES

CROSS-REFERENCE TO RELATED APPLICATIONS

This application is a U.S. National Phase Application of PCT/EP2016/073770, filed Oct. 5, 2016 the contents of which are incorporated herein by reference in their entireties for all purposes.

FIELD OF THE INVENTION

The invention relates to lithium ion batteries with silicon-containing anode materials.

BACKGROUND OF THE INVENTION

Rechargeable lithium ion batteries are nowadays the most practically useful electrochemical energy storage means with maximum gravimetric energy densities of, for example, up to 250 Wh/kg.

The electrolytes of lithium ion batteries generally comprise as their main component cyclic/aliphatic carbonates, for example the methyl or ethyl carbonates specified in U.S. Pat. No. 7,476,469. A further constituent of electrolytes is in many cases film-forming additives, such as vinylene carbonate (VC) or the fluorine-containing carbonates from DE 102013210631. Nitriles or amines are also recommended as electrolyte additives, as for example in DE 69027143, U.S. Pat. No. 8,551,661 or Gu-Yeon Kim and J. R. Zahn, journal of The Electrochemical Society, 162 (3) A437 to A447 (2015). The addition of nitrate salts is known, for example, from US 2006222944, U.S. Pat. No. 7,476,469, WO 2015160773 or Etacheri, Vinodkumar et al., Langmuir 2012, 28, 6175 to 6184. DE 102013210631 teaches that combination of lithium nitrate and particular film-forming additives can improve cycling stability.

Graphitic carbon is a material in widespread use for the negative electrode. ("anode") for lithium ion batteries. A drawback, however, is its relatively low electrochemical capacity of theoretically at most 372 mAh per gram of graphite, corresponding only to about one tenth of the electrochemical capacity theoretically achievable with lithium metal. To solve this problem, silicon has been recommended as an alternative anode active material. Silicon forms binary electrochemically active alloys with lithium, which can have a very high lithium content. The maximum lithium content known is found at $Li_{4.4}Si$, which corresponds to a very high theoretical specific capacity in the region of 4200 mAh per gram of silicon.

Disadvantageously, the intercalation and deintercalation of lithium into silicon is accompanied by a very great change in volume of silicon which can reach 300%. The expansion in volume leads to very significant mechanical stress on the crystallites, which ultimately leads to their breakup. This process, referred to as electrochemical grinding, in the active material and in the electrode structure, leads to loss of electrical contacting and hence to the destruction of the electrode with loss of capacity. The decrease in the capacity over the course of multiple charge and discharge cycles is referred to as fading or continuous loss of capacity and is generally irreversible.

To reduce the mechanical stress and hence to prevent electrochemical grinding, the use of nanoscale or nanostructured silicon particles for the anode material of lithium ion cells has been recommended in many cases, as described, for example, in WO 2014/202529 or EP 1730800. The nanoscale silicon particles of EP 1730800 are aggregated here to form aggregates.

M. Gauthier discusses, in journal of Power Sources, 256, 2014, pages 32 to 36, anode materials comprising silicon particles characterized by very broad multimodal size distributions and considerable coarse fractions. The half-cells described do not yet reach the coulombic efficiency required in practice. US 2003235762 also describes silicon particles having considerable coarse proportions without giving any details in relation to the process for producing the silicon particles. Thus, the grain form and sphericity of the silicon particles or nonaggregated silicon particles are implicitly not disclosed. The active material of the US 2009305129 document contains silicon particles having crystallite sizes of <100 nm and particle sizes of 7 to 25 μm, which have been produced via gas phase processes.

US 2005/0214646 describes batteries wherein the anode material in the charged state has a lithium/silicon ratio of not more than 4.0. Molar Li/Si ratios of 3.5 and greater are described in specific terms. JP 4911835 uses Li/Si ratios for the anode material of charged lithium ion batteries in the range from 2.3 to 4.0.

Silicon-containing lithium ion batteries known to date still have excessively high initial and/or continuous losses of capacity. Lithium ion batteries sustain initial losses of capacity because, when they are charged for the first time, the surface of the silicon anode material reacts with constituents of the electrolyte to form passivating protective layers (solid electrolyte interfaces; SEI), which leads to immobilization of lithium and hence to a restriction in the capacity of the battery. Continuous losses of capacity arise from changes in volume of the silicon particles in further charge and discharge cycles of the lithium ion batteries and the associated mechanical attrition of the anode since new silicon surfaces are exposed here, which in turn react with constituents of the electrolyte with further formation of SEI, which leads to immobilization of further lithium and a continuous rise in resistance on the anode side. Since the amount of mobile lithium, corresponding to the usable capacity, in the full cell is limited, it is rapidly used up and the capacity of the cell is degraded after too few cycles. The decline in the reversible capacity of lithium ion batteries during the advanced cycles is also referred to as fading.

BRIEF SUMMARY OF THE INVENTION

Against this background, it was an object of the present invention to provide lithium ion batteries having anodes comprising silicon particles, which have high initial reversible capacity and, in the subsequent cycles, stable electrochemical characteristics with a minimum decline in reversible capacity (fading).

DETAILED DESCRIPTION OF PREFERRED EMBODIMENTS

The invention provides lithium ion batteries comprising a cathode, an anode comprising silicon particles, a separator and an electrolyte, characterized in that
the electrolyte comprises one or more inorganic salts selected from the group comprising alkali metal salts and ammonium salts of nitrate ($NO_3^-$), nitrite ($NO_2^-$) azide ($N_3^-$), phosphate ($PO_4^{3-}$), carbonate ($CO_3^{2-}$), borates and fluoride ($F^-$); and
the material of the anode (anode material) in the fully charged lithium ion battery is only partly lithiated.

The present invention further provides methods of operating lithium ion batteries comprising a cathode, an anode comprising silicon particles, a separator and an electrolyte, characterized in that
the electrolyte comprises one or more inorganic salts selected from the group comprising alkali metal salts and ammonium salts of nitrate ($NO_3^-$), nitrite ($NO_2^-$), azide ($N_3^-$), phosphate ($PO_4^{3-}$), carbonate ($C_3^{2-}$), borates and fluoride ($F^-$); and
the material of the anode (anode material) is only partly lithiated in the fully charged lithium ion battery.

It is thus essential to the invention that the anode material, especially the silicon particles, is only partly lithiated in the fully charged lithium ion battery. "Fully charged" refers to the state of the battery in which the anode material of the battery has its highest loading of lithium. Partial lithiation of the anode material means that the maximum lithium uptake capacity of the silicon particles in the anode material is not exhausted. The maximum lithium uptake capacity of the silicon particles corresponds generally to the formula $Li_{4.4}Si$ and is thus 4.4 lithium atoms per silicon atom. This corresponds to a maximum specific capacity of 4200 mAh per gram of silicon.

The ratio of the lithium atoms to the silicon atoms in the anode of a lithium ion battery (Li/Si ratio) can be adjusted, for example, via the flow of electrical charge. The degree of lithiation of the anode material or of the silicon particles present in the anode material is proportional to the electrical charge that has flowed. In this variant, in the charging of the lithium ion battery, the capacity of the anode material for lithium is not fully exhausted. This results in partial lithiation of the anode.

In an alternative, preferred variant, the Li/Si ratio of a lithium ion battery is adjusted via cell balancing. In this case, the lithium ion batteries are designed such that the lithium uptake capacity of the anode is preferably greater than the lithium release capacity of the cathode. The effect of this is that, in the fully charged battery, the lithium uptake capacity of the anode is not fully exhausted, meaning that the anode material is only partly lithiated.

In the case of the partial lithiation of the invention, the Li/Si ratio in the anode material in the fully charged state of the lithium ion battery is preferably ≤2.2, more preferably ≤1.98 and most preferably ≤1.76. The Li/Si ratio in the anode material in the fully charged state of the lithium ion battery is preferably ≥0.22, more preferably ≥0.44 and most preferably ≥0.66.

The capacity of the silicon in the anode material of the lithium ion battery is preferably utilized to an extent of ≤50%, more preferably to an extent of ≤45% and most preferably to an extent of ≤40%, based on a capacity of 4200 mAh per gram of silicon.

The degree of lithiation of silicon or the exploitation of the capacity of silicon for lithium (Si capacity utilization $\alpha$) can be determined, for example, using the following formula:

$$\alpha = \frac{\beta}{\gamma \cdot FG \cdot \omega_{Si}}$$

β: delithiation capacity of the Si-containing anode at the respective charge circuit voltage of the lithium ion battery;

γ: maximum capacity of silicon for lithium in the case of a stoichiometry of $Li_{22}Si_5$ (corresponding to 4200 mAh/g);

FG: basis weight of the anode coating;

$\omega_{Si}$: proportion by weight of Si in the anode coating.

Determination of the Delithiation Capacity β firstly, the lithium ion battery is converted to the electrically charged state by charging it by the cc (constant current) method with a constant current of 5 mA/g (corresponding to C/25) until attainment of the voltage limit of 4.2 V. In the course of this, the anode is lithiated. The lithium ion battery thus charged is opened, the anode is removed and it is used to assemble a button half-cell (CR2032 type, Hohsen Corp.) with a lithium counterelectrode (Rockwood Lithium, thickness 0.5 mm, Dm=15 mm). A glass fiber filter paper (Whatman, GD Type C) impregnated with 120 μl of electrolyte can serve as separator (Dm=16 mm). The electrolyte used is a 1.0 molar solution of lithium hexafluorophosphate in a 3:7 (v/v) mixture of fluoroethylene carbonate and ethyl methyl carbonate, to which 2.0% by weight of vinylene carbonate has been added. The cell is generally built in a glovebox (<1 ppm of $H_2O$ and $O_2$ in the glovebox atmosphere). The water content of the dry mass of all feedstocks is preferably below 20 ppm.

The delithiation capacity β of the Si-containing anode coating is determined by charging the button half-cell thus produced (working electrode=positive electrode=Si anode; counterelectrode=negative electrode=lithium) at C/25 until attainment of the voltage limit of 1.5 V. The electrochemical measurements on the full- and half-cell are conducted at 20° C. The abovementioned constant current is based on the weight of the coating of the positive electrode.

Determination of the Proportion by Weight of Si $\omega_{Si}$

Electrolyte is first washed out of a sample of the fully delithiated anode coating (without Cu foil) with tetrahydrofuran. This is followed by acidic digestion of a sample. For this purpose, 75 mg of the anode coating are added to a microwave digestion vessel (100 ml TFM liner from Anton Paar), and 5 ml of $HNO_3$ (65% p.a.), 0.25 ml of HCl (37%, p.a.) and 1 ml of HF (40%, superpure) are added. The microwave digestion vessel is closed, introduced into a microwave apparatus (Multiwave 3000 Anton Paar) and treated at 950 W for 45 min. The digestive is transferred completely into 50 ml tubes and made up to 50 ml with water. 0.50 ml thereof are withdrawn, 2.50 ml of 4% boric acid are added and the mixture is made back up to 50 ml (dilution: factor of 100). The proportion by weight of Si $\omega_{Si}$ is determined by means of ICP-OES (inductively coupled plasma) emission spectrometry (instrument: Optima 7300 DV, from Perkin Elmer; sample introduction system: Meinhard atomiser with cyclone spray chamber; calibration range: 0.1 to 20.0 mg/l Si; Certipur standard Si stock solution from Merck with 1000 mg/l Si (certified)).

The electrolytes contain one or more inorganic salts selected from the group comprising alkali metal salts and ammonium salts of nitrate ($NO_3^-$, nitrite ($NO_2^-$), azide ($N_3^-$), phosphate ($PO_4^{3-}$), carbonate ($CO_3^{2-}$), borates and fluoride ($F^-$).

Preference is given to alkali metal salts, especially lithium salts. Preference is also given to nitrates. Preferred nitrates are sodium nitrate, potassium nitrate, ammonium nitrate, tetrabutylammonium nitrate and lithium nitrate. Particular preference is given to lithium nitrate.

The inorganic salts are generally of sparing solubility in the electrolyte. The solubility of the inorganic salts in the electrolyte under standard conditions according to DIN 50014 (23/50) is preferably <1% by weight, more preferably ≤0.8% by weight and most preferably ≤0.5% by weight.

The inorganic salts are present in the electrolyte to an extent of preferably 0.01% to 10% by weight, more preferably 0.01% to 5% by weight and most preferably 0.01% to 1% by weight, based on the total weight of the electrolyte.

The concentration of the inorganic salts in the electrolyte is preferably 0.01 to 2 molar, more preferably 0.01 to 1 molar, even more preferably 0.02 to 0.5 molar and most preferably 0.03 to 0.3 molar.

In addition, the electrolyte may additionally comprise one or more aprotic solvents, one or more lithium-containing conductive salts, optionally film formers and optionally one or more additives.

The lithium-containing conductive salt is preferably selected from the group comprising $LiPF_6$, $LiBF_4$, $LiClO_4$, $LiAsF_6$, $(LiB(C_2O_4)_2, LiBF_2(C_2O_4))$, $LiSO_3C_xF_{2x+1}$ $LiN(SO_2C_xF_{2x+1})_2$ and $LiC(SO_2CxF_{2x+1})_3$, where x assumes integer values from 0 to 8, and mixtures thereof.

The lithium-containing conductive salts are different than the inorganic salts essential to the invention.

The lithium-containing conductive salts generally have good solubility in the electrolyte. The solubility of the lithium-containing conductive salts in the electrolyte under standard conditions according to DIN 50014 (23/50) is preferably ≥1% by weight and more preferably 10% to 12% by weight.

The electrolyte preferably contains 1 to 50 parts by weight, more preferably 5 to 30 parts by weight and most preferably 10 to 20 parts by weight of lithium-containing conductive salt.

The lithium-containing conductive salts are present in the electrolyte to an extent of preferably ≥1% by weight, more preferably 1 to 20% by weight and most preferably 10 to 15% by weight, based on the total weight of the electrolyte.

The concentration of the lithium-containing conductive salts in the electrolyte is preferably 0.5 to 1.5 molar and more preferably 0.8 to 1.2 molar.

The molar ratio of the lithium-containing conductive salts to the inorganic salts essential to the invention is preferably 1:1 to 20:1, more preferably 1:1 to 15:1 and most preferably 5:1 to 15:1.

The aprotic solvent is preferably selected from the group comprising organic carbonates, such as dimethyl carbonate, diethyl carbonate, ethyl methyl carbonate, ethylene carbonate, vinylene carbonate, propylene carbonate, butylene carbonate; cyclic and linear esters, such as methyl acetate, ethyl acetate, butyl acetate, propyl propionate, ethyl butyrate, ethyl isobutyrate; cyclic and linear ethers, such as 2-methyltetra-hydrofuran, 1,2-diethoxymethane, THF, dioxane, 1,3-dioxolane, diisopropyl ether, diethylene glycol dimethyl ether; ketones, such as cyclopentanone, diisopropyl ketone, methyl isobutyl ketone; lactones, such as γ-butyrolactone; sulfolane, dimethyl sulfoxide, formamide, dimethylformamide, 3-methyl-1,3-oxazolidine-2-one and mixtures of these solvents. Particular preference is given to the above-described organic carbonates.

The electrolyte preferably contains 100 parts by weight of aprotic solvent.

Examples of film for are vinylene carbonate and fluoroethylene carbonate. The electrolyte may contain, for example, 5 to 100 parts by weight, preferably 10 to 70 parts by weight, more preferably 20 to 50 parts by weight and most preferably 12 to 30 parts by weight of film former. The electrolyte preferably contains ≤10% by weight, more preferably ≤2% by weight and even more preferably 0.5% by weight of film former, based on the total weight of the electrolyte. Most preferably, the electrolyte does not contain any film former.

Examples of electrolyte additives are organic isocyanates, for example for lowering the water content, HF scavengers, solubilizers for LIF, organic lithium salts, complex salts, amines such as tributylamine, tripentylamine, trihexylamine or triisooctylamine and/or nitriles such as capronitrile, valeronitrile or 3-(fluorodimethylsilyl)butanenitrile.

The anode material comprises silicon particles.

The volume-weighted particle size distribution of the silicon particles is preferably between the diameter percentiles $d_{10} \geq 0.2$ μm and $d_{90} \leq 20.0$ μm, more preferably between $d_{10} \geq 0.2$ μm and $d_{90} \leq 10.0$ μm and most preferably between $d_{10} \geq 0.2$ μm to $d_{90} \leq 5.0$ μm. The silicon particles have a volume-weighted particle size distribution having diameter percentiles $d_{10}$ of preferably ≤10 μm, more preferably ≤5 μm, even more preferably ≤3 μm and most preferably ≤1 μm. The silicon particles have a volume-weighted particle size distribution having diameter percentiles $d_{90}$ of preferably ≥0.5 μm. In one embodiment of the present invention, the aforementioned $d_{90}$ value is preferably ≥5 μm.

The volume-weighted particle size distribution of the silicon particles has a breadth $d_{90}-d_{10}$ of preferably ≤15.0 μm, more preferably ≤12.0 μm, even more preferably ≤10.0 μm, especially preferably ≤8.0 μm and most preferably ≤4.0 μm. The volume-weighted particle size distribution of the silicon particles has a breadth $d_{90}-d_{10}$ of preferably ≥0.6 μm, more preferably ≥0.8 μm and most preferably ≥1.0 μm.

The volume-weighted particle size distribution of the silicon particles has diameter percentiles $d_{50}$ of preferably 0.5 to 10.0 μm, more preferably 0.6 to 7.0 μm even more preferably 2.0 to 6.0 μm and most preferably 0.7 to 3.0 μm.

Twice to five times, especially two to three times, the aforementioned $d_{50}$ values is preferably less than the layer thickness of the anode coating. The layer thickness of the anode coating is specified further down. This provision is helpful in order to virtually rule out oversize grains.

The volume-weighted particle size distribution of the silicon particles is determinable by static laser scattering using the Mie model with the Horiba LA 950 instrument with ethanol as dispersion medium for the silicon particles.

The volume-weighted particle size distribution of the silicon particles is preferably monomodal. The volume-weighted particle size distribution of the silicon particles is generally narrow, as can be seen from the $d_{10}$ or $d_{90}$ values and $d_{90}-d_{10}$ values.

The silicon particles are preferably non-aggregated, preferably non-agglomerated and/or preferably non-nanostructured. "Aggregated" means that spherical or very substantially spherical primary particles, as initially formed, for example, in gas phase processes in the production of the silicon particles, aggregate to form aggregates later on in the reaction of the gas phase process. These aggregates can form agglomerates later on in the reaction. Agglomerates are a loose assembly of aggregates. Agglomerates can readily be split back up into the aggregates by kneading and dispersing methods that are typically used. Aggregates can be divided into primary particles only partly, if at all, by these methods. Aggregates and agglomerates, owing to the way in which they are formed, inevitably have quite different sphericities and grain shapes from the silicon particles of the invention. The presence of silicon particles in the form of aggregates or agglomerates can be visualized, for example, by means of conventional scanning electron microscopy (SEM). Static light scattering methods for determination of the particle size distributions or particle diameters of silicon particles, by contrast, cannot distinguish between aggregates and agglomerates.

Non-nanostructured silicon particles generally have characteristic BET surface areas. The BET surface areas of the silicon particles are preferably 0.01 to 30.0 m$^2$/g, more preferably 0.1 to 25.0 m$^2$/g, especially preferably 0.2 to 20.0 m$^2$/g, and most preferably 0.2 to 18.0 m$^2$/g. The BET surface area is determined according to DIN 66131 (with nitrogen).

The silicon particles have a sphericity of preferably $0.3 \leq \Psi \leq 0.9$, more preferably $0.5 \leq \Psi \leq 0.85$ and most preferably $0.65 \leq \Psi \leq 0.85$. Silicon particles having such sphericities are especially obtainable by production by mean of grinding processes. The sphericity $\Psi$ is the ratio of the surface area of a ball of the same volume to the actual surface area of a body (definition of Wadell). Sphericities can be determined, for example, from conventional SEM images.

The silicon particles may consist of elemental silicon, a silicon oxide or a binary, ternary or multinary silicon/metal alloy (with, for example, Li, Na, K, Sn, Ca, Co, Ni, Cu, Cr, Ti, Al, Fe). Preference is given to using elemental silicon, especially since it has an advantageously high storage capacity for lithium ions.

Elemental silicon is understood to mean high-purity polysilicon with a low proportion of foreign atoms (for example B, P, As), silicon doped selectively with foreign atoms (for example B, P, As), but also silicon from metallurgical processing, which may include elemental contamination (for example Fe, Al, Ca, Cu, Zr, C).

If the silicon particles contain a silicon oxide, the stoichiometry of the oxide SiO$_x$ is preferably in the range of $0<x<1.3$. If the silicon particles contain a silicon oxide with higher stoichiometry, the layer thickness thereof at the surface is preferably less than 10 nm.

When the silicon particles are alloyed with an alkali metal M, the stoichiometry of the alloy M$_y$Si is preferably in the range of $0<y<5$. The silicon particles may optionally have been prelithiated. If the silicon particles have been alloyed with lithium, the stoichiometry of the alloy Li$_z$Si is preferably in the range of $0<z<2.2$.

Particular preference is given to silicon particles containing $\geq 80$ mol % of silicon and/or 20 mol % of foreign atoms, most preferably $\leq 10$ mol % of foreign atoms.

The surface of the silicon particles may optionally be covered by an oxide layer or by other inorganic and organic groups. Particularly preferred silicon particles bear Si—OH or Si—H groups or covalently attached organic groups, for example alcohols or alkenes, on their surface. It is possible via the organic groups, for example, to control the surface tension of the silicon particles and especially match it to the solvents or binders that may be used in the production of the anode coatings.

The silicon content in the anode material is preferably between 40% by weight and 95% by weight, more preferably between 50% by weight and 90% by weight and most preferably between 60% by weight and 80% by weight, based on the total weight of the anode material.

The silicon particles can be produced, for example, by grinding processes. Useful grinding processes include, for example, dry or wet grinding processes as described, for example, in DE-A 102015215415.

The anode material is preferably based on a mixture comprising silicon particles, one or more binders, optionally graphite, optionally one or more further electrically conductive components and optionally one or more added substances.

By use of further electrically conductive components in the anode material, it is possible to reduce the transfer resistances within the electrode and between the electrode and output conductor, which improves the current durability of the lithium ion battery. Preferred further electrically conductive components are conductive black, carbon nanotubes or metallic particles, for example copper.

The anode material preferably contains 0% to 40% by weight, more preferably 0% to 30% by weight and most preferably 0% to 20% by weight of one or more further electrically conductive components, based on the total weight of the anode material.

Preferred binders are polyacrylic acid or the alkali metal salts thereof, especially lithium or sodium salts, polyvinyl alcohols, cellulose or cellulose derivatives, polyvinylidene fluoride, polytetrafluoroethylene, polyolefins, polyimides, especially polyamide imides, or thermoplastic elastomers, especially ethylene-propylene-diene terpolymers. Particular preference is given to poly acrylic acid, polymethacrylic acid or cellulose derivatives, especially carboxymethylcellulose. Particular preference is also given to the alkali metal salts, especially lithium or sodium salts, of the aforementioned binders. Most preferred are the alkali metal salts, especially lithium or sodium salts, of polyacrylic acid or of polymethacrylic acid. It is possible to use all or preferably a proportion of the acid groups of a binder in the form of salts. The binders have a molar mass of preferably 100 000 to 1 000 000 g/mol. It is also possible to use mixtures of two or more binders.

The graphite used may generally be natural or synthetic graphite. The graphite particles preferably have a volume-weighted particle size distribution between the diameter percentiles $d_{10}>0.2$ µm and $d_{90}<200$ µm.

Examples of anode material additives are pore formers, dispersants, leveling agents or dopants, for example elemental lithium.

Preferred formulations for the anode material of the lithium ion batteries contain preferably 5 to 95% by weight, especially 60% to 85% by weight, of silicon particles; 0% to 40% by weight, especially 0% to 20% by weight, of further electrically conductive components; 0% to 80% by weight, especially 5% to 30% by weight, of graphite; 0% to 25% by weight, especially 5% to 15% by weight, of binders; and optionally 0% to 80% by weight, especially 0.1% to 5% by weight, of added substances; where the figures in % by weight are based on the total weight of the anode material and the proportions of all constituents of the anode material add up to 100% by weight.

In a preferred formulation for the anode material, the proportion of graphite particles and further electrically conductive components totals at least 10% by weight, based on the total weight of the anode material.

The constituents of the anode material can be processed to give an anode ink or paste, for example, in a solvent such as water, hexane, toluene, tetrahydrofuran, N-methylpyrrolidone, N-ethylpyrrolidone, acetone, ethyl acetate, dimethyl sulfoxide, dimethylacetamide or ethanol, or solvent mixtures, preferably using rotor-stator machines, high-energy mills, planetary kneaders, stirred ball mills, agitators or ultrasound appliances.

The anode ink or paste has a pH of preferably 2 to 7.5 (determined at 20° C., for example with the WTW pH 340i pH meter with SenTix RJD probe).

The anode ink or paste can, for example, be applied to a coper foil or another current collector as described, for example, in WO 2015/117838.

The layer thickness, i.e. the dry layer thickness of the anode coating, is preferably 2 μm to 500 μm, more preferably from 10 μm to 300 μm.

A lithium ion battery generally comprises a first electrode as cathode, a second electrode as anode, a membrane arranged between the two electrodes as separator, two electrically conductive connections to the electrodes, a housing that accommodates the components mentioned, and an electrolyte containing lithium ions, with which the separator and the two electrodes are impregnated, wherein a portion of the second electrode contains the anode material of the invention.

The electrolyte of the in and anodes of the invention can be processed with further conventional substances and materials by known methods to give lithium ion batteries, analogously to the manner described in WO 2015/117838, for example.

Surprisingly, the lithium ion batteries of the invention exhibit improved cycling characteristics. The lithium ion batteries have a small irreversible loss of capacity in the first charging cycle and stable electrochemical characteristics with only slight fading in the subsequent cycles. With the procedure of the invention, it is thus possible to achieve a low initial loss of capacity and additionally a low continuous loss of capacity of the lithium ion batteries. Overall, the lithium ion batteries of the invention have very good stability. This means that, even in the case of a multitude of cycles, there are barely any fatigue phenomena, for example as a result of mechanical breakdown of the anode material of the invention or SEI.

Surprisingly, it is possible by the procedure of the invention to obtain lithium ion batteries which, as well as the aforementioned advantageous cycling characteristics, simultaneously also have a high volumetric energy density.

These effects are achieved via synergistic interaction of the partial lithiation of the invention and of the inorganic salts of the invention in the electrolyte. The preferred silicon particles can enhance these effects even further.

The examples which follow serve to further elucidate the invention.

Example 1

Production of Silicon Particles by Grinding

A mixture of 2 kg of ethanol (99% purity) and 500 g of pure silicon having a particle size distribution d10=8 μm, d50=15 μm and d90=25 μm, produced from coarser particles with a fluidized bed jet mill was produced and stirred for 20 minutes until all the solids were finely distributed in the suspension. The grinding space of a Netzsch LabStar LS1 laboratory stirred ball mill with ZETA ceramic grinding system was filled with 490 ml of yttria-stabilized zirconia grinding beads having a mean diameter of 0.3 mm and closed. The suspension of silicon dust and ethanol was then introduced into the cooled grinding vessel of the mill and pumped through the mill in circulation with a throughput of 40 kg/h. The particles in the suspension were ground at a mill speed of 3000 rpm for 55 min. After the grinding operation, ethanol was added to the suspension until its solids concentration was 21.8% by weight.

The silicon particles thus obtained were non-aggregated and in the form of chips. Measurement of the particle distribution by static laser scattering employing the Mie model with a Horiba LA 950 in a highly dilute suspension in ethanol gave d10=0.26 μm, d50=0.79 μm and d90=2.30 μm, and a breadth (d90–d10) of 2.0 μm.

Example 2

Anode with the Silicon Particles from Example 1

12.5 g of a 14.4% by weight Si suspension in water, produced from centrifugate of the ethanolic Si suspension from example 1, were dispersed in 0.372 g of a 35% by weight solution of polyacrylic acid in water (Sigma-Aldrich, MW~250 000 g/mol) and 0.056 g of lithium hydroxide monohydrate (Sigma-Aldrich) by means of a dissolver at a circumferential speed of 4.5 m/s for 5 min and of 17 m/s for 30 min with cooling at 20° C. After addition of 0.645 g of graphite (Imerys, KS6L C), the mixture was then stirred at a circumferential speed of 12 m/s for a further 30 min. After degassing, the dispersion was applied to a copper foil of thickness 0.030 mm (Schlenk Metallfolien, SE-Cu58) by means of a film applicator with gap width 0.12 mm (Erichsen, model 360). The anode coating thus produced was then dried at 80° C. and an air pressure of 1 bar for 60 min. The mean basis weight of the dry anode coating was 2.73 mg/cm$^2$.

Comparative Example 3

Lithium Ion Battery with the Anode from Example 2, with Partial Lithiation, Without Lithium Nitrate in the Electrolyte The electrochemical studies were conducted in a button cell (CR2032 type, Hohsen Corp.) in a 2-electrode arrangement. The electrode coating from example 2 was diecut as counterelectrode or negative electrode. (Dm×15 mm), and a coating based on 1:1:1 lithium nickel manganese cobalt oxide with a content of 94.0% and a mean basis weight of 14.5 mg/cm$^2$ (sourced from Custom Cells Itzehoe GmbH, D-25524 Itzehoe) as working electrode or positive electrode (Dm=15 mm). A glass fiber filter paper (Whatman, GD type C) impregnated with 80 μl of electrolyte served as separator (Dm=16 mm). The electrolyte used consisted of a 1.0 molar solution of lithium hexafluorophosphate (LiPF$_6$) in a 3:7 (v/v) mixture of fluoroethylene carbonate (FEC) and ethyl methyl carbonate (EMC), to which 2% by weight of vinylene carbonate (VC) had been added. The cell was built in a glovebox (<1 ppm H$_2$O$_2$); the water content in the dry mass of all components used was below 20 ppm.

The electrochemical testing was conducted at 20° C. The cell was charged by the cc/cv method (constant current/constant voltage) with a constant current of 5 mA/g (corresponding to C/25) in the first cycle and of 60 mA/g (corresponding to C/2) in the subsequent cycles and, on attainment of the voltage limit of 4.2 V, at constant voltage until the current went below 1.2 mA/g (corresponding to C/100) or 15 mA/g (corresponding to C/8). The cell was discharged by the cc method (constant current) at a constant current of 5 mA/g (corresponding to C/25) in the first cycle and of 60 mA/g (corresponding to C/2) in the subsequent cycles until attainment of the voltage limit of 3.0 V.

The specific current chosen was based on the weight of the coating of the positive electrode.

Owing to the formulation in examples 2 and 3, the cell balancing of the lithium ion battery corresponded to a partial lithiation of the anode.

The discharge capacity of the full cell from comparative example 3 was determined as a function of the number of cycles. The full cell in the second cycle had a reversible initial capacity of 2.02 mAh/cm² and, after 80 charge/discharge cycles, still had 80% of its original capacity.

Comparative Example 4

Lithium Ion Battery with the Anode from Example 2, with Partial Lithiation, Without Lithium Nitrate in the Electrolyte The anode with the silicon particles in the form of chips from example 2 was tested as described in example 3, with the difference that the electrolyte used consisted of a 1.0 molar solution of lithium hexafluorophosphate (LiPF$_6$ in a 3:7 (v/v) mixture of vinylene carbonate (VC) and diethyl carbonate (DEC), to which 10.0 by weight of fluorodimethylsilylbutanenitrile (FEC) and 2.0% by weight of tributylamine had been added.

The discharge capacity of the full cell from comparative example 4 was determined as a function of the number of cycles. The full cell in the second cycle had a reversible initial capacity of 2.08 mAh/cm² and, after 106 charge/discharge cycles, still had 80% of its original capacity Example 5

Lithium Ion Battery with the Anode from Example 2, with Partial Lithiation and Lithium Nitrate in the Electrolyte The anode with the silicon particles in the form of chips from example 2 was tested as described in example 3, with the difference that the electrolyte used consisted of a 1.0 molar solution of lithium hexafluorophosphate (LiPF$_6$) in a 1:2 (v/v) mixture of ethylene carbonate (EC) and diethyl carbonate (DEC), to which 2% by weight of lithium nitrate had been added. The electrolyte solution was saturated with lithium nitrate, which was shown by a colorless lithium nitrate sediment. The actual solubility of the lithium nitrate in the electrolyte used in this example is in the region of <0.5% by weight.

The discharge capacity of the full cell from example 5 was determined as a function of the number of cycles.

The full cell in the second cycle had a reversible discharge capacity of 2.02 mAh/cm² and, after 140 charge/discharge cycles, still had 80% of its original capacity.

Discussion of Comparative Examples 3 and 4 and of Example 5

The lithium ion battery from example 5, by comparison with the lithium ion batteries from comparative examples 3 and 4, surprisingly shows more stable electrochemical characteristics in the course of cycling. This was all the more unexpected in that the electrolyte from example 5 did not receive the film-forming additives from comparative example 4 that are used for the formation of a more stable SEI layer and hence for a better progression of cycling.

The number of cycles before the capacity goes below a continuous retention of capacity of 80% in example 5 exceeds that for the selected reference electrolyte mixture proceeding from electrolyte compositions known from the literature for silicon-containing anodes [Kawashima, A. et al., Journal of The Electrochemical Society 2011, 158, A798-A801; Aurbach, D. et al., Langmuir 2012, 28, 955-976] (example 3) by 75%. The initial capacity (after cycle 1) is within a similar range for all three (comparative) examples.

Comparative Example 6

Lithium Ion Battery with Full Lithiation and with Lithium Nitrate in the Electrolyte Analogous to example 1, but with a grinding time of 600 min, nanoscale non-aggregated silicon particles were produced in the form of chips. The solids content of the suspension was adjusted to 22.3% by weight by addition of ethanol. A measurement of the particle distribution gave a size distribution with d10=0.09 μm, d50=0.18 μm and d90=0.32 μm.

As described in example 2, an anode coating was produced from these particles. The mean basis weight of the dry anode coating was 2.18 mg/cm².

Thereafter, the anodes were tested as described in example 3, with the difference that the electrolyte used consisted of a 1.0 molar solution of lithium hexafluorophosphate (LiPF$_6$) in a 1:4 (v/v) mixture of propylene carbonate (PC) and ethyl methyl carbonate (EMC), to which 2% by weight of lithium nitrate had been added.

The lithium ion battery was operated with full lithiation.

The fully laden full cell in the second cycle has a reversible discharge capacity of only 1.7 mAh/cm² and, after 14 charge/discharge cycles, has only 80% of its original capacity.

The comparison of example 5 and comparative example 6 shows that the cycling stability of the lithium ion batteries can the considerably increased by partial lithiation. Addition of lithium nitrate, the inorganic salt of the invention, to the electrolyte can enhance this effect even further, as demonstrated by the above-discussed (comparative) examples 3~5.

The invention claimed is:

1. A lithium ion battery comprising: a cathode, an anode comprising elemental silicon particles, a separator and an electrolyte, wherein the electrolyte comprises one or more inorganic salts selected from the group consisting of alkali metal salts and ammonium salts of nitrate, nitrite, azide, phosphate, carbonate, borate, and fluoride; and wherein the anode material in the lithium ion battery when fully charged is only partly lithiated, with the proviso that the ratio of the lithium atoms to the silicon atoms in the partly lithiated anode material of the fully charged lithium ion battery is ≤2.2.

2. The lithium ion battery of claim 1, wherein the ratio of lithium atoms to silicon atoms in the partly lithiated anode material of the fully charged battery is ≤1.98.

3. The lithium ion battery of claim 1, wherein the capacity of the silicon of the anode material in the lithium ion battery is utilized to an extent of ≤50%, based on the maximum capacity of 4200 mAh per gram of silicon.

4. The lithium ion battery of claim 1, wherein the electrolyte comprises one or more inorganic salts selected from the group consisting of sodium nitrate, potassium nitrate, ammonium nitrate, tetrabutylammonium nitrate and lithium nitrate.

5. The lithium ion battery of claim 1, wherein the electrolyte contains the inorganic salts to an extent of 0.01% to 10% by weight, based on the total weight of the electrolyte.

6. The lithium ion battery of claim 1, wherein the concentration of the inorganic salts in the electrolyte is 0.01 to 2 molar.

7. The lithium ion battery of claim 1, wherein the electrolyte further comprises one or more lithium-containing conductive salts selected from the group comprising $LiPF_6$, $LiBF_4$, $LiClO_4$, $LiAsF_6$, $(LiB(C_2O_4)_2$, $LiBF_2(C_2O_4))$, $LiSO_3C_xF_{2x+1}$, $LiN(SO_2C_xF_{2x+1})_2$ and $LiC(SO_2CxF_{2x+1})_3$, where x assumes integer values from 0 to 8.

8. The lithium ion battery of claim 1, wherein the molar ratio of the lithium-containing conductive salts to the inorganic salts that are essential to the invention is 1:1 to 20:1.

9. The lithium ion battery of claim 1, wherein the electrolyte does not contain any film former selected from the group consisting of vinylene carbonate and fluoroethylene carbonate.

10. The lithium ion battery of claim 1, wherein the silicon particles of the anode have a volume-weighted particle size distribution having a diameter percentile $d_{50}$ of 0.5 to 10.0 μm.

* * * * *